Jan. 5, 1943.　　　G. W. CARMICHAEL　　　2,307,665
CONVEYER
Filed April 26, 1940　　　6 Sheets-Sheet 1

INVENTOR
George W. Carmichael
BY
ATTORNEY

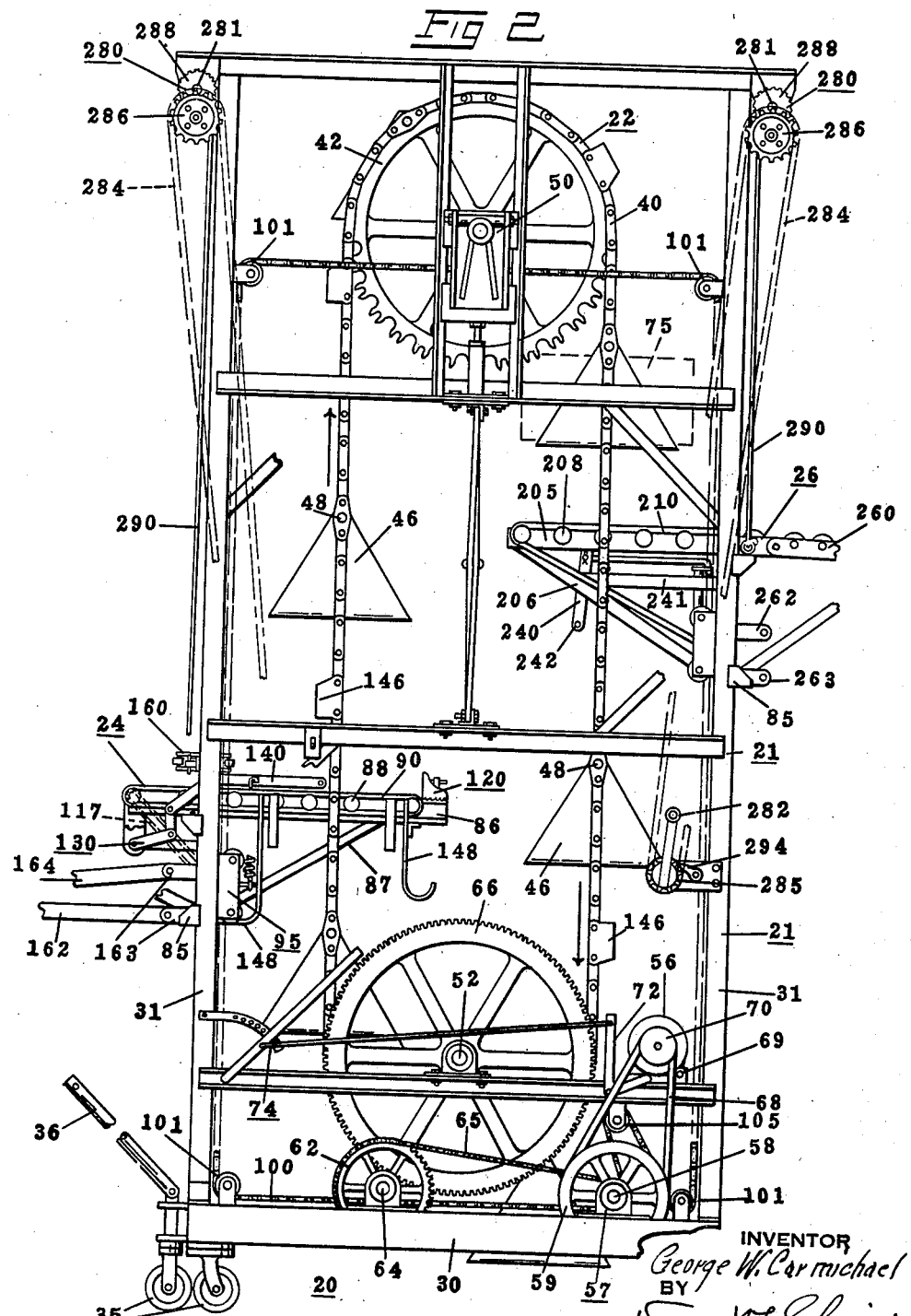

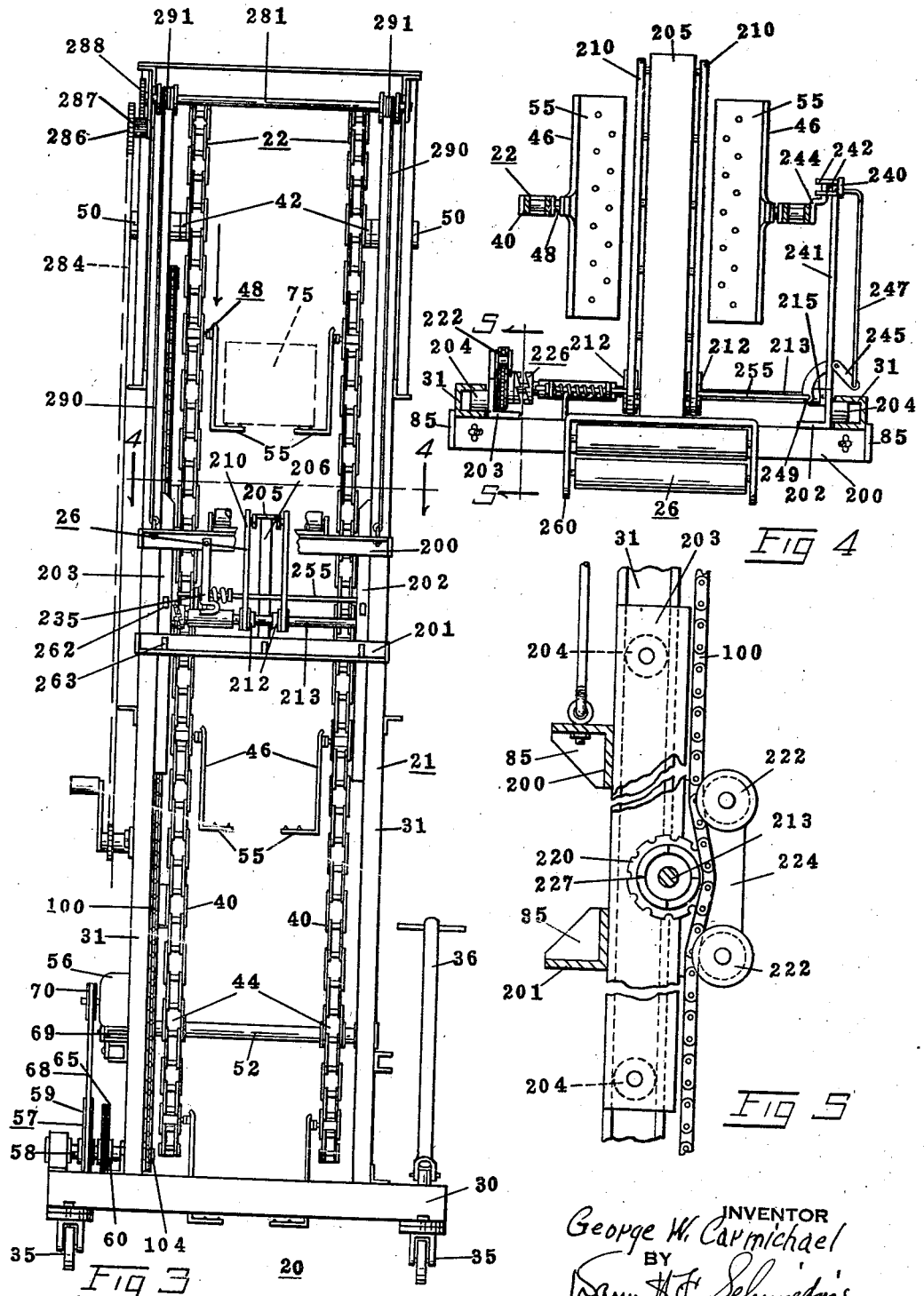

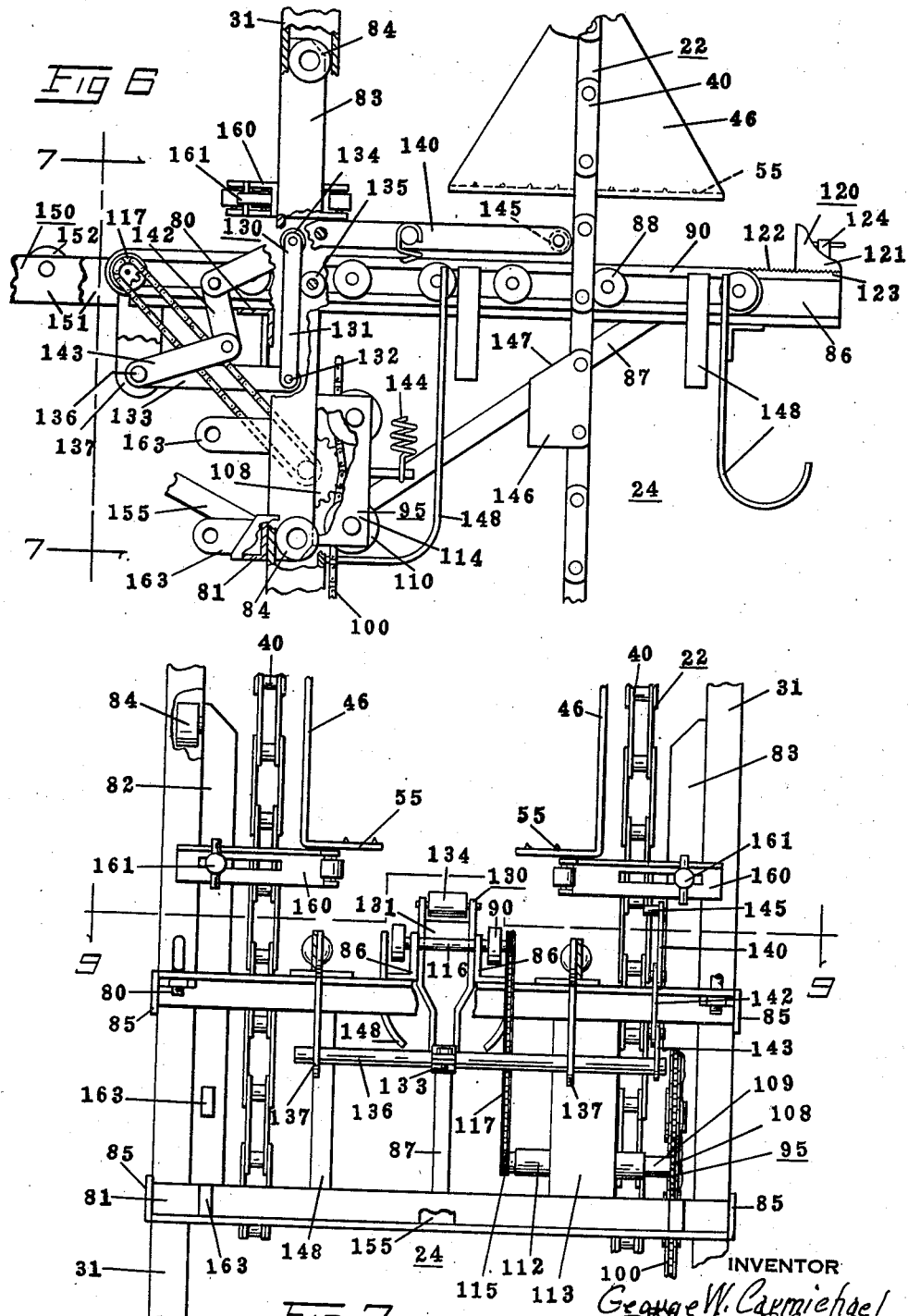

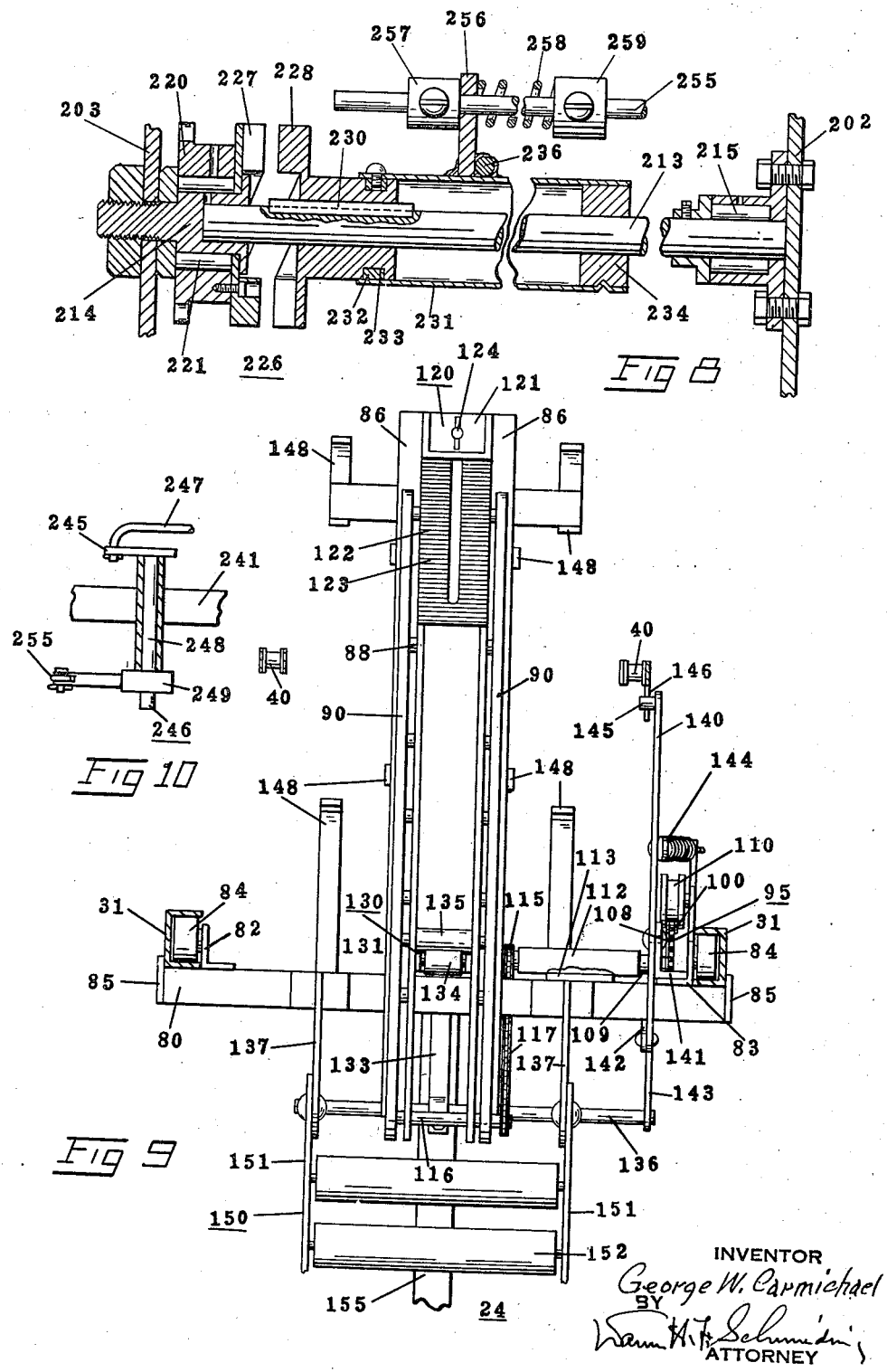

Jan. 5, 1943.  G. W. CARMICHAEL  2,307,665
CONVEYER
Filed April 26, 1940  6 Sheets-Sheet 6

INVENTOR
George W. Carmichael
BY
ATTORNEY

Patented Jan. 5, 1943

2,307,665

UNITED STATES PATENT OFFICE 2,307,665

CONVEYER

George W. Carmichael, Columbus, Ohio, assignor to Carmichael Machine Company, Columbus, Ohio, a partnership, consisting of Mead S. Carmichael, George S. Carmichael, Meade S. Carmichael, Jr., Sherman R. Carmichael, and Wilmer W. Carmichael Application April 26, 1940, Serial No. 331,855

4 Claims. (Cl. 198—20)

The present invention relates to conveying apparatus, and more particularly to apparatus for conveying units such as cases, from one elevation to another.

One object of the invention is to provide a conveying apparatus comprising two conveyers cooperating for transferring units from one conveyer to the other, one conveyer being translatable with respect to the other and carrying mechanism for moving units therealong, and mechanism operable in synchronism with the other of the conveyers for rendering the mechanism operative and inoperative.

A still further object of the invention is to provide a conveyer including a mechanism for moving units therealong, which mechanism is actuated by an endless flexible driving member, the connection between the mechanism and the driving member being such that the conveyer can be translatably moved for example, from one elevation to another, while maintaining driving relationship between the mechanism and driving member.

Still another object of the invention is to provide a conveying apparatus comprising two conveyers cooperating for transferring units from one to the other, one conveyer having mechanism for moving units therealong, and a stop member normally biased to a position for blocking movement of units by the mechanism, which member is movable to a second position for releasing the units by a device operating in synchronism with the other of the conveyers.

In the drawings:

Fig. 2 is a view of the opposite side of the conveying apparatus shown in Fig. 1;

Fig. 3 is an end view of the conveying apparatus. For the sake of clarity the parts of the apparatus on the opposite end thereof are not shown;

Fig. 4 is a fragmentary view taken on line 4—4 of Fig. 3, but on a larger scale, and showing the top of an unloading conveyer;

Fig. 5 is a view in section taken on line 5—5 of Fig. 4, but on a larger scale;

Fig. 6 is a fragmentary side view, partly in section, of a loading conveyer, certain parts being broken away;

Fig. 7 is a view taken on line 7—7 of Fig. 6;

Fig. 8 is a fragmentary view, in section, showing a clutch and driving mechanism;

Fig. 9 is a view taken on line 9—9 of Fig. 7;

Fig. 10 is a view, partly in section, showing a crank member;

Figure 1:
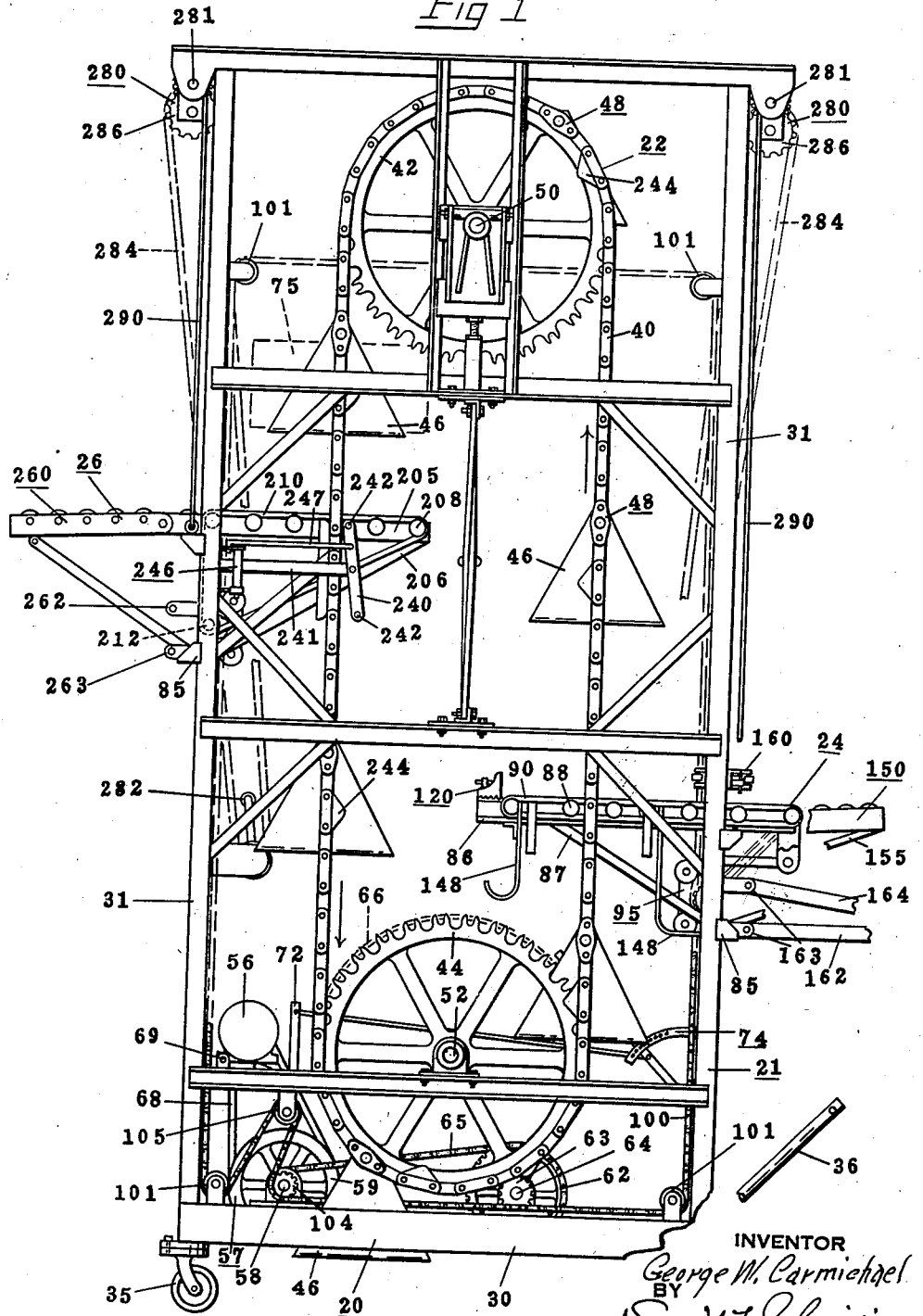
Fig. 1 is a side view of a conveying apparatus.

Referring to the drawings, a conveying apparatus 20 is shown comprising in general, a frame 21 and conveyers 22, 24 and 26 mounted on the frame 21.

Preferably the frame 21 is formed of steel members welded together and includes a base 30, four upright posts 31 and suitable braces for maintaining the frame rigid. Two opposite ends of the frame are open to receive the conveyers 24 and 26, which conveyers are translatably movable in vertical directions. The posts 31 are channel shaped and positioned with the open sides thereof facing the conveyers 24 and 26, respectively. The base 30 is mounted on suitable casters 35 so that the apparatus may be wheeled about by a handle 36.

The conveyer 22 comprises two endless chains 40 each mounted on sprocket wheels 42 and 44 and supporting carriers 46 attached to the chains by bearings 48. The center of weight of the carriers 46 is below the bearings 48 so that the carcarriers are maintained vertical. Two sprocket wheels 42 are individually mounted on the upper part of the frame by suitable bearings 50. The space between the wheels 42 is open to permit passage of the carriers 46. Two sprocket wheels 44 are mounted on a drive shaft 52. The carriers 46 have laterally extending seats 55 and the carriers on one chain are opposite carriers on the other chain so that the seats of two opposed carriers form a support for carrying units, for example, cases. The carriers 46 are adapted to pass on either side of the conveyers 24 and 26 when the chains 40 are driven by the sprocket wheels 44.

The conveyer 22 is driven by an electric motor 56 connected to the drive shaft 52 through speed reducing mechanism 57. The mechanism 57 includes a shaft 58 having a pulley wheel 59 and a sprocket wheel 60 mounted thereon. A sprocket wheel 62 and a gear 63, mounted on a shaft 64, are driven by a chain 65 interconnecting the sprocket wheel 60 and the sprocket wheel 62. The gear 63 meshes with a gear 66 mounted on the shaft 52. The motor 56 drives the speed reducing mechanism 57 through a belt 68 interconnecting the motor and pulley 59.

The speed of the mechanism 57 may be regulated by mounting the motor 56 on an off-center pivot 69 and providing a variable pulley 70 for driving the belt 68. The pulley 70 is varied by tilting the motor 56 about its pivot by a crank lever 72 movable to a plurality of positions by a detent arrangement shown generally at 74. This type of speed regulator is well known and therefore it is not shown in detail.

When the conveyer 22 is operating, the carriers 46 are moved by the chains 40 in the direction indicated by the arrows in Figs. 1, 2 and 3. Units, for example boxes 75, may be supported by the conveyer 24 at the inner end thereof having the edges of the boxes extending over the edges of the conveyer so that the seats 55 of the carriers 46 engage the boxes and carry them upwardly between the sprocket wheels 42 and downwardly to the conveyer 26. Thus units at the level of the conveyer 24 may be transferred to the conveyer 26, by the conveyer 22.

The conveyer 24 includes a frame formed by two cross members 80 and 81, and two vertical members 82 and 83 interconnecting the members 80 and 81. The members 80 and 81 are provided with shoulders 85 that overlap the outer wall of the posts 31. This braces the posts and also guides the conveyer for vertical movement. The members 82 and 83 are each provided with rollers 84 that extend into the channels of the adjacent posts 31 for guiding the conveyer vertically.

Two parallel angle irons 86 are supported adjacent the outer ends thereof by the member 80 and the other ends thereof extend inwardly between the seats 55 of the carriers 48. The inner ends of the angle irons are supported by a strut 87, one end of which strut is attached to the member 81. A plurality of pulley wheels 88 are mounted in alignment with one another on the outside walls of the angle irons 86 and belts 90 are mounted over the pulleys 88 on each iron 86. The belts 90, supported on the pulleys 88, are adapted to carry boxes, and the like, toward the inner end of the conveyer 24.

The pulleys 88 are driven by the motor 56 through mechanism, indicated generally at 95, which mechanism maintains driving connection between the pulleys 88 and the motor 56 while the conveyer 24 is translatably moved vertically on the frame 21. The mechanism 95 comprises an endless flexible chain 100 mounted on four idler wheels 101, which guide the chain 100 up one end of the frame, across the frame and down the opposite end of the frame. The chain 100 is driven by a sprocket wheel 104 mounted on the shaft 58, the chain being maintained in engagement with the sprocket wheel 104 by an idler wheel 105. The chain 100 drives a sprocket wheel 108 mounted on a shaft 109. Idler wheels 110 maintain the chain 100 in engagement with the wheel 108. The idler wheels 110 are supported on a plate 114 attached to the member 83 of the conveyer frame. Thus the wheels 110 retain their positions relative to the sprocket wheel 108 as the conveyer 24 is translatably moved vertically. The shaft 109 is supported by a bearing 112 attached to a plate 113 interconnecting the cross members 80 and 81. A sprocket wheel 115 is mounted on the shaft 109 and drives a shaft 116 mounted on the angle irons 86 through a chain 117, which chain is connected with a sprocket wheel mounted on the shaft 116. Two of the wheels 88 are mounted on the shaft 116. These wheels drive the belts 90 clockwise, as viewed in Fig. 6.

An adjustable stop device 120 is provided at the inner end of the angle irons 86 for stopping cases carried on the belts 90 at a predetermined position with respect to the carriers 46. The stop device comprises a block 121 having corrugations on the bottom thereof that interlock with corrugations 122 of a plate 123 attached over the ends of the angle irons 86. The block 121 may be clamped to the plate 123 by a suitable clamping device represented at 124.

A movable stop device 130 is operated in synchronism with the conveyer 22 for timing the delivery of each unit to the stop 120 so that incoming units will not interfere with a preceding unit to be picked up by the carriers 46. The stop device 130 comprises a channel shaped member 131 extending vertically between the angle irons 86 and pivotally mounted at 132 on an arm 133. The upper end of the member 131 is forked and an anti-friction roller 134 is mounted between the tines of the fork. A roller 135 is supported between the angle irons 86 for maintaining the stop member upright. The arm 133 is attached to a shaft 136 supported by two brackets 137 extending from the cross member 80 and when the shaft is rotated the arm 133 raises or lowers the stop member 131. The shaft 136 is rotated by a lever 140, pivotally mounted to a bracket 141 on the member 83, which lever 140 is connected to the shaft by a link 142 and arm 143, the arm 143 being attached to the shaft. A spring 144 interconnects the lever 140 and a lug on the plate 114 for biasing the lever 140 clockwise as viewed in Fig. 6, for yieldingly urging the stop member 131 upwardly. The inner end of the lever 140 is provided with a pin 145 disposed in alignment with plates 146, which plates are attached to one of the chains 40 a predetermined distance below each of the carriers 46. The plates 146 have sloping edges 147 that engage the pin 145 for rotating the lever 140 counter-clockwise for drawing the member 131 below the upper reach of the belts 90. The spring 144 draws the lever 140 downward when the latter is released by the plates 146. It will be noted that the plates 146 engage the pin 145 on the lever 140 after the carriers 46 have moved a predetermined distance above the belts 90.

Suitable guides, illustrated at 148, are provided for aligning the carriers 46 with units extending over the edges of the conveyer 24. These guides prevent swinging of the carriers and interference of the carriers with the parts of the conveyer.

A runway 150 is connected with the conveyer 24 for carrying units to the belts 90. The runway may be of the well known type comprising two parallel bars 151 having rollers 152 supported therebetween. The outer end of the runway 150 is supported by a strut 155 and the inner end of the runway is attached to the brackets 137.

Units, for example, boxes 75, passing along the conveyer 24 may be centered on the conveyer by roller guides 160 adjustably positioned on the members 82 and 83, respectively, by suitable clamps 161.

A platform 162 on which an operator may stand, is supported on the conveyer 24 by lugs 163 and a brace 164.

The conveyer 24 may be elevated on the frame to any desired position by mechanism to be described hereinafter.

The conveyer 26 is provided with mechanism for moving units along the conveyer, which mechanism is rendered operative after a unit is deposited on the conveyer and then rendered inoperative before the next unit is deposited on the conveyer by a device operating in synchronism with the conveyer 22.

The conveyer 26 includes cross members 200 and 201 interconnected by vertical members 202 and 203. The members 202 and 203 are provided with rollers 204 at each end thereof, which rollers extend into the channel of the posts 31 for guiding the conveyer vertically. Shoulders 85 are provided on the ends of the members 200 and 201, which shoulders engage the outer wall of the posts 31.

An inverted channel iron 205 is attached adjacent one end thereof to the member 200, and the inner end thereof is supported by a strut 206. A plurality of pulley wheels 208 are mounted on each side of the channel iron 205 in alignment with one another. Belts 210 are mounted on the pulleys 208 on each side of the channel iron 205 for carrying units along the conveyer 26.

The belts 210 are driven by two pulleys 212 mounted on a shaft 213. One end of the shaft 213 is supported in a socket bearing 214 attached to the member 203 and the opposite end of the shaft 213 is journaled in a roller bearing 215 attached to the member 202. The shaft 213 is adapted to be driven by the chain 100 through a sprocket wheel 220 and a clutch 226. The sprocket wheel 220 is supported on the socket bearing 214 by roller bearings 221 and is held in engagement with the chain 100 by two idler wheels 222 supported on a plate 224 attached to the member 203. It is apparent that the conveyer 26 may be moved vertically and the sprocket wheel 220 and chain 100 will be maintained in mesh.

The clutch 226 comprises a clutch block 227 secured to the sprocket wheel 220 and a clutch block 228 that is keyed to the shaft 213 by a key 230. The clutch block 228 is connected with a sleeve 231 by a split collar 232 attached to the sleeve 231, which collar fits in a groove 233 formed in the block 228. The opposite end of the sleeve 231 is supported by a bushing 234 on the shaft 213. The sleeve 231 is prevented from rotation by a hook 235 depending from the member 200 and engaging a laterally extending pin 236 attached to the sleeve 231. The block 228 is slidable longitudinally on the shaft 213 for engaging and disengaging the block 227.

The clutch blocks are moved together by mechanism operated in synchronism with the conveyer 22 for connecting the sprocket wheel 220 and shaft 213 immediately after a unit is deposited on the belts 210 and disconnecting the wheel and shaft before the next unit is deposited on the belts. This clutch operating mechanism comprises a lever 240 pivotally mounted on the end of an arm 241, which arm extends from the member 202. Pins 242 extend laterally from each end of the lever 240 in the path of lugs 244 attached to one of the chains 40. The lugs 244 are disposed a predetermined distance above the surface of the seats 55 of the carriers. As the carriers descend the lugs 244 first engage the upper pin 242 and rotate the lever 240 clockwise, as viewed in Fig. 1. As the lugs move downwardly they engage the lower pin 242 and rotate the lever 240 counter-clockwise. The lever 240 is connected to an arm 245 of a crank member 246 by a rod 247. The member 246 comprises a shaft 248 having the arm 245 extending from one end thereof and an arm 249 extending from the opposite end. The shaft 248 is journaled in a bearing mounted on the arm 241. A rod 255 interconnects the arm 249 and the sleeve 231 of the clutch mechanism 226. The rod 255 is connected to the sleeve 231 by a plate 256 attached to the sleeve 231 and through which one end of the rod 255 extends. A block 257, attached to the rod 255, engages the plate 256 when the rod 255 is moved to the right, as viewed in Fig. 8, for disconnecting the clutch blocks. A spring 258 is disposed about the rod 255 intermediate the plate 256 and a block 259 attached to the rod 255. When the rod 255 is moved to the left, as viewed in Fig. 8, the sleeve 231 is resiliently urged to the left to engage the clutch block 228 with the clutch block 227. The resilient connection insures proper interlocking of the catches on the clutch blocks.

It is apparent that when the lever 240 is rotated clockwise by the lugs 244 the rod 255 is moved to the left and the clutch blocks engage. When the lever 240 is rotated counter-clockwise by the lugs 244, the rod 255 is moved to the right for disconnecting the clutch blocks. Thus the belts 210 will be operated to move units outwardly along the conveyer after a unit is deposited thereon by the conveyer 22 and the belts will be stopped before the next unit is deposited thereon. The speed of the belts 210 relative to the speed of the chains 40 of the conveyer 22, is such that the belts move a unit to the outer ends thereof during the movement of a lug 244 from the upper end of the lever 240 to the lower end of the lever.

Preferably, a roller conveyer 260, similar to the conveyer 150, is attached to the outer end of the conveyer 26 to facilitate removal of units therefrom. Also two lugs 262 are attached to the members 202 and 203, respectively, and two lugs 263 are attached to the member 201 for attaching a platform to the conveyor on which an operator may stand.

The conveyer 26 may be translatably moved vertically on the frame 21 by an elevator mechanism 280. This mechanism comprises a shaft 281 supported at the top of the frame 21. The shaft 281 may be rotated by a crank 282 mounted on the side of the frame 21, which crank is connected with the shaft 281 through gear mechanism. This mechanism comprises a chain 284 mounted on a sprocket wheel 285 and a sprocket wheel 286, the latter wheel driving a gear 287 meshed with a gear 288 on the shaft 281. Two cables 290, wound on spools 291 on the shaft 281, are connected to the conveyer member 200. By turning the crank 282, the conveyer may be translatably moved to any desired height on the frame 21. The crank 282 is provided with a ratchet device 294 for locking the crank in position.

The conveyer 24 may be translatably moved vertically on the frame 21 by mechanism similar to the mechanism 280 and similar parts of the elevator mechanism for the conveyer 24 have been given the same reference numerals. Parts of the elevator mechanism for the conveyer 24 have been omitted from the drawings for the sake of clarity.

When it is desirable to elevate units for example boxes 75, from one level to another, as when the boxes are to be stacked in a warehouse, the boxes are fed to the conveyer 24 over the runway 150. The belts 90, rotating continuously while the conveyer apparatus is in operation, move the boxes against the stop member 131. The stop member 131 is withdrawn from the path of the first box when a lug 146 raises the lever 140. The belts 90 then carry the box inwardly against the stop 120. The lever 140 is released from the plate 146 before the first box passes over the stop member 131 so that the member 131 is yieldingly urged upwardly against the bottom of the moving box. As the box passes from the roller 134 of the stop member 131 the stop member is raised in the path of the next box and blocks the movement of the box. If there is no space between the boxes on the belts 90, the tension of the spring 144 may be such as to cause the member 131 to raise one end of the box passing thereover and thus be in a position to block the following box. The box abutting the stop 120 is picked up by two carriers 46 and carried upwardly. After the two carriers have moved upwardly a predetermined distance a plate 146 then raises the lever 140 to cause the next box to be released by the stop member 131. It is apparent that a single box will be moved in alignment with the carriers 46 after a preceding box has been removed from the conveyer. Thus, preceding boxes will not interfere with boxes being picked up by the carriers 46 of the conveyer 22.

The stop 120 is adjusted so that the boxes will be centrally disposed on the carriers 46 to maintain the carriers level.

The boxes are carried upwardly and between the sprocket wheels 42 by the carriers 46 and downwardly to the conveyer 26. When a box is deposited on the belts 210 of the conveyer 26, the belts are motionless. After the seats 55 of the carriers are lowered below the upper reaches of the belts 210 and no longer engage the box, a lug 244 rotates the lever 240 for connecting the clutch blocks 227 and 228. This causes the sprocket wheel 220 to drive the belts 210 for moving the deposited box outwardly along the conveyer 26. When the lug 244 strikes the lower pin 242 of the lever 240, the lever 240 is moved to cause the clutch block 228 to disengage from the clutch block 227. Thus the belts 210 are stopped before the next box is deposited thereon.

As the cases are stacked higher, the elevator 26 may be raised to the top level of the stack by the crank 282. Also, the conveyer 24 may be similarly elevated or lowered on the frame 21 for removing cases from various elevations.

Figures 11, 12, 13:
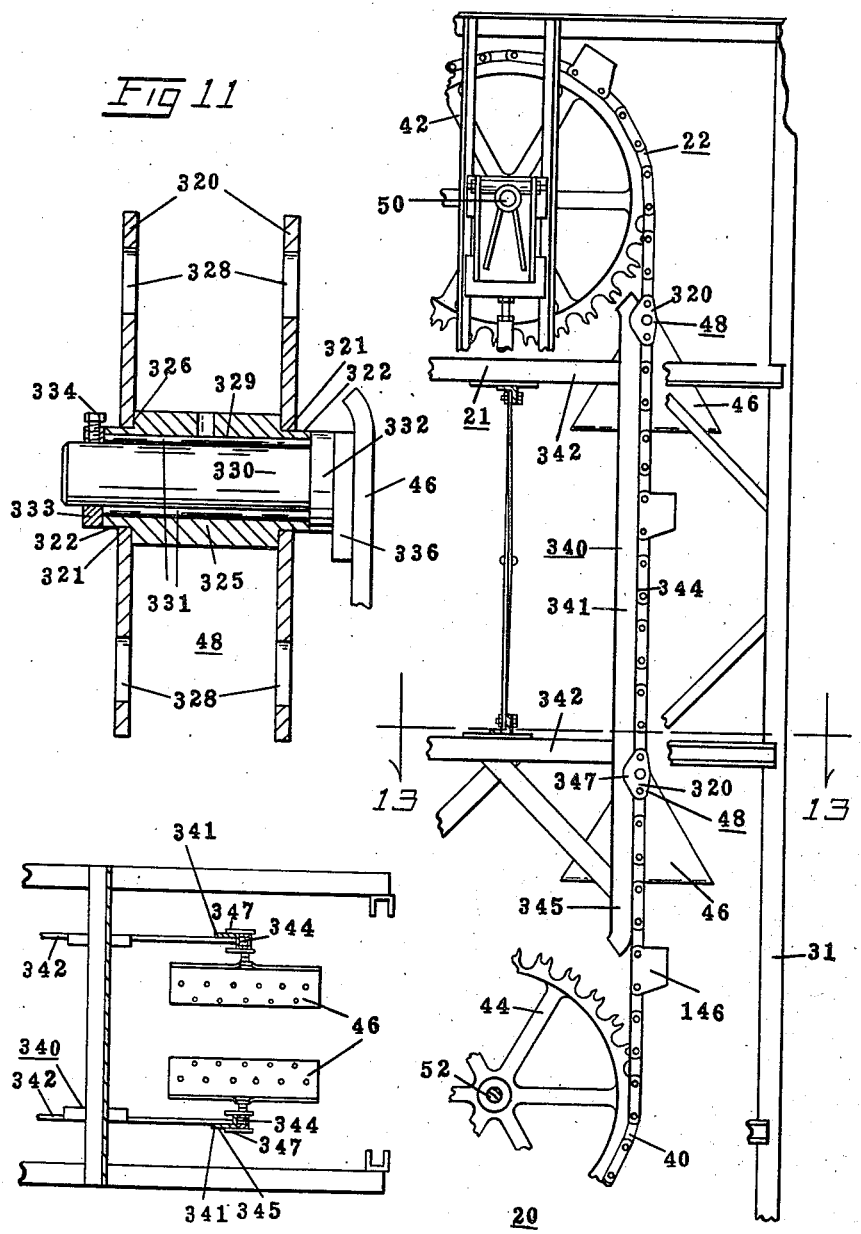
Fig. 11 is a view in section of a bearing.
Fig. 12 is a fragmentary side view of another type of conveying apparatus.
Fig. 13 is a view taken on line 13—13 of Fig. 12.

Referring to Fig. 11 of the drawings, the structure of the bearing 48 is shown in detail. Two link plates 320 have openings 321 for receiving the necks 322 of a tubular member 325. The tubular member is provided with shoulders 326, which shoulders abut the plates adjacent the openings 321 for locking the member 325 in place. The plates 320 also have openings 328 at each end for receiving a suitable coupling pin for connecting the plates with adjacent links in the chain 40.

A pin 330 extends into the opening 329 and through the member 325 and a plurality of rollers 331 are interposed between the pin and the walls of the opening 329 for minimizing friction when the pin is rotated. A shoulder 332 is formed on one end of the pin 330 and a collar 333 is attached to the pin at the opposite end by a set screw 334. The shoulder and collar engage the end edges of the tubular member to prevent endwise movement of the pin in the opening 329. The shoulder and collar also abut the ends of the rollers 331 for preventing the rollers from working out of the ends of the opening 329.

A carrier 46 is welded to one end of the pin 330. Preferably a reenforcing plate 336 is interposed between the end of the pin and the carrier.

The bearing 48 is readily connected in the chain 40 and provides a rigid assembly particularly suitable for supporting loads at one end of the bearing.

Referring to Fig. 12, another embodiment of the conveyer 20 is shown. Where the distance between the centers of the wheels 42 and 44 is more than eighteen feet for example, the chain 40 has a tendency to vibrate between the wheels. To prevent or minimize this vibration a guide member 340 is positioned along the inside edge of each of the chains 40. The guide members comprise angle irons 341 that are suspended by braces 342 suitably attached to the frame 21 of the conveyer apparatus. One face 344 of the angle irons 341 is adapted to abut the edges of the links of the chain 40 and the faces 345 of the angle irons face outwardly. The link plates 320 of the bearings 48 are provided with shoulders 347 that extend beyond the inner edges of the links of the chain and the inside faces of these shoulders are adapted to move along the faces 345 and the inner edges of the faces 344 of the angle irons 341. It is apparent that the links of the chains 40 abut the guides when the chains tend to vibrate in the direction of the guide members and the shoulders 347 abut the faces 345 and inner edge of the face 344 when the chains tend to vibrate toward one another.

While the forms of embodiments of the present invention as herein disclosed constitute preferred forms, it is to be understood that other forms might be adopted all coming within the scope of the claims which follow.

I claim:

1. In combination, a conveyer including, an endless belt and mechanism for moving said belt for moving units along the conveyer, a continuously operated second conveyer for sequentially transferring units carried thereon to the first mentioned conveyer, the first mentioned conveyer, belt and mechanism being translatable with respect to the second conveyer; and means operative according to operation of the second conveyer for rendering said mechanism operative after the transfer of a unit from the second conveyer to the first mentioned conveyer and for rendering said mechanism inoperative before a sequential unit is transferred to the first mentioned conveyer.

2. In combination, a conveyer for carrying units in one direction; a second conveyer for carrying units in a direction laterally with respect to the first mentioned direction, one of said conveyers being adapted to transfer units carried thereon to the other conveyer; means forming a guide for the second mentioned conveyer, said guide extending in said one direction; means for moving the second mentioned conveyer along the guide and for retaining the same in any of a plurality of positions along said guide; a clutch member; means continuously driving the clutch member; a second clutch member driven by the first clutch member and arranged to drive the second mentioned conveyer, said clutch members and driving means being carried by the second mentioned conveyer and movable therewith along the guide; and means actuated by and in timed relation with the first mentioned conveyer for periodical actuating the clutch to start and stop the second mentioned conveyer.

3. In combination, a conveyer for carrying units in one direction; a second conveyer for carrying units in a direction laterally with respect to the first mentioned direction, one of said conveyers being adapted to transfer units carried thereon to the other conveyer; means forming a guide for the second mentioned conveyer, said guide extending in said one direction; means for moving the second mentioned conveyer along the guide and for retaining the same in any of a plurality of positions along said guide; a drive member extending in said one direction; a clutch member continuously driven by the drive member; a second clutch member driven by the first clutch member and arranged to drive the second mentioned conveyer, said clutch members being carried by the second mentioned conveyer and movable therewith along the guide; and means actuated by and in timed relation with the first mentioned conveyer for periodically actuating the clutch to start and stop the second mentioned conveyer.

4. In combination, a conveyer for carrying units in one direction; a second conveyer for carrying units in a direction laterally with respect to the first mentioned direction, one of said conveyers being adapted to transfer units carried thereon to the other conveyer; means forming a guide for the second mentioned conveyer, said guide extending in said one direction; means for moving the second mentioned conveyer along the guide and for retaining the same in any of a plurality of positions along said guide; means continuously driving the second mentioned conveyer, said driving means being carried by the second mentioned conveyer and movable therewith along said guide; a releasable stop carried by the second mentioned conveyer and interposed in the path of movement of the units on the second conveyer and arranged to detain the unit engaging the same although the second conveyer tends to conveye said unit; and means actuated by and in timed relation with the first mentioned conveyer for periodically releasing the stop.

GEORGE W. CARMICHAEL.